United States Patent
Beck

(10) Patent No.: US 8,353,553 B2
(45) Date of Patent: Jan. 15, 2013

(54) ACTUATION MEANS FOR A ROTATABLY SUPPORTED FLAP IN AN AUTOMOBILE COMPRISING A PUSH-PUSH KINEMATICS

(75) Inventor: Christian Beck, Roettingen (DE)

(73) Assignee: ITW Automotive Products GmbH, Iserlohn (DE)

( * ) Notice: Subject to any disclaimer, the term of this patent is extended or adjusted under 35 U.S.C. 154(b) by 176 days.

(21) Appl. No.: 13/056,555

(22) PCT Filed: Oct. 23, 2009

(86) PCT No.: PCT/IB2009/054697
§ 371 (c)(1),
(2), (4) Date: Jan. 28, 2011

(87) PCT Pub. No.: WO2010/058304
PCT Pub. Date: May 27, 2010

(65) Prior Publication Data
US 2011/0174102 A1  Jul. 21, 2011

(30) Foreign Application Priority Data
Nov. 19, 2008  (DE) .......................... 10 2008 057 933

(51) Int. Cl.
*B60K 15/05* (2006.01)
(52) U.S. Cl. ...................... 296/97.22; 74/110
(58) Field of Classification Search .................. None
See application file for complete search history.

(56) References Cited

U.S. PATENT DOCUMENTS

| | | | | |
|---|---|---|---|---|
| 4,225,764 A | * | 9/1980 | Buttner | 200/518 |
| 4,948,928 A | * | 8/1990 | Willigman | 200/38 R |
| 5,178,265 A | * | 1/1993 | Sepke | 200/528 |
| 6,113,160 A | * | 9/2000 | Johansson et al. | 292/169 |
| 2009/0139991 A1 | | 6/2009 | Nakaya | |
| 2009/0307869 A1 | | 12/2009 | Salice | |

FOREIGN PATENT DOCUMENTS

| | | |
|---|---|---|
| DE | 3149635 A1 | 6/1983 |
| DE | 19650594 A1 | 6/1998 |
| EP | 0802345 A2 | 10/1997 |
| EP | 2017112 A1 | 1/2009 |
| WO | 2008031814 A1 | 3/2008 |

OTHER PUBLICATIONS

ISR for PCT/IB2009/054697 mailed Feb. 8, 2010.

* cited by examiner

*Primary Examiner* — Glenn Dayoan
*Assistant Examiner* — Jason S Daniels
(74) *Attorney, Agent, or Firm* — Lowe Hauptman Ham & Berner LLP

(57) ABSTRACT

A drive for actuating a flap pivotably supported in or on an automobile includes a push-push kinematics. The kinematics includes a pushbar axially displaceably supported in a housing and having an external actuation end cooperating with the flap. A rotatable ring encloses the pushbar. A groove runs parallel to the pushbar axis and engages with a protrusion at the inner circumference of the ring. A first deflection face runs obliquely to the pushbar axis and cooperates with the protrusion of the ring to rotate this ring when the pushbar is pushed into the housing. A locking recess situated at the pushbar for receiving the protrusion when the pushbar is released, to lock the pushbar in the housing. A second deflection face runs obliquely to the pushbar axis and cooperates with the protrusion when the pushbar is moved out of the locked position by being pushed farther into the housing.

14 Claims, 3 Drawing Sheets

Figure 1:
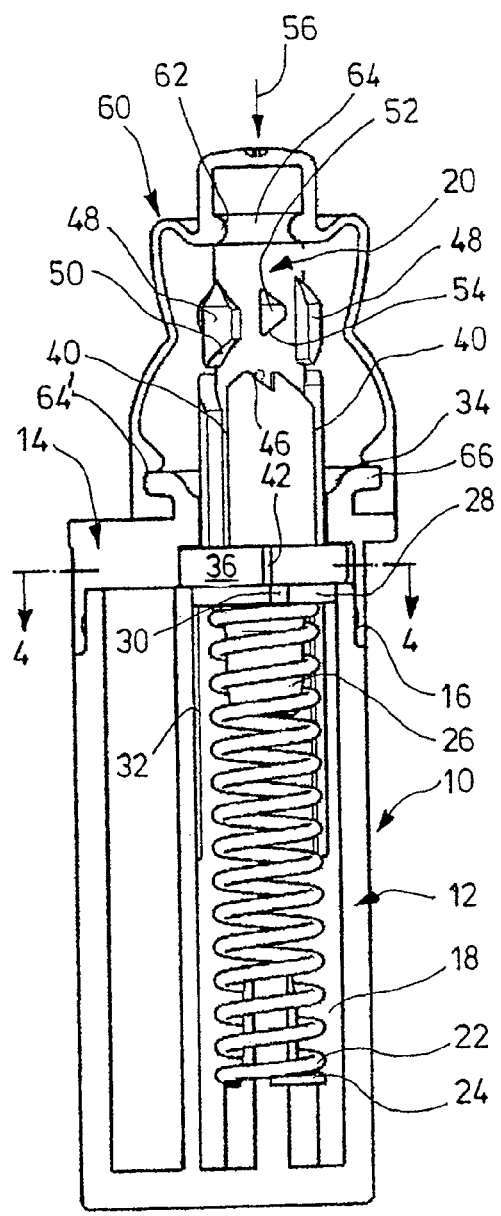

ACTUATION MEANS FOR A ROTATABLY SUPPORTED FLAP IN AN AUTOMOBILE COMPRISING A PUSH-PUSH KINEMATICS

RELATED APPLICATIONS

The present application is national phase of PCT/IB2009/054697 filed Oct. 23, 2009, and claims priority from German Application Number 10 2008 057 933.5 filed Nov. 19, 2008.

The present invention relates to a pivotable drive for an automotive flap, in particular for a fuel tank flap, fitted with a push-push kinematics, as defined in claim 1.

It is known to combine a push-push kinematics with a fuel tank flap. The fuel tank flap is closed in said kinematics' locked position. When unlocking the fuel tank, and by unlocking the pushbar of said kinematics, said flap may be partly pivoted outward when a pressure is applied to it. The spring configured in the push-push kinematics acts on the pushbar and thereby on the fuel tank flap to rotate it outward by a given angle to allow manually seizing it and to fully pivot it The push-push kinematics of the known state of the art uses a so-called control wire operating in concert with a cardioid cam. Manufacturing the known push-push kinematics is comparative costly and such designs may offer only limited service lives. Again kinematics assembly is relatively elaborate.

The objective of the present invention is to fit an automobile with a push-push kinematics allowing economical manufacture and undergoing little wear.

This problem is solved by the features of claim 1.

The present invention comprises the following features:

a housing appropriate for installation in an automobile, a pushbar supported in the housing in axially displaceable manner and partly projecting in all axial positions through a housing aperture beyond said housing and fitted with an external drive end cooperating with the flap, a spring inside the housing prestressing the pushbar out of the housing, a ring enclosing the pushbar and being axially affixed in the housing while being rotatable, at least one groove running parallel to the pushbar axis on the pushbar's outer side, and at least one protrusion at the inside of the ring engaging the groove across another pushbar adjustment range, whereby the ring preserves its rotational position when the pushbar is axially displaced, a first deflection face at the pushbar and oblique to its axis, situated between the groove and the drive end, cooperating with the ring's protrusion and rotating said ring by a predetermined angle when said pushbar has been moved by a first predetermined excursion into the housing, a locking recess which points to the drive end and is situated in the pushbar while being circumferentially spaced from the first deflection face and which receives the protrusion when, after the first excursion, the pushbar has been released, as a result of which, following a return excursion, the pushbar is locked into a locking position, a second deflection face oblique to the pushbar axis configured between the locking recess and the drive end and cooperating with the protrusion when said pushbar is forced out of the locking position and by means of a second excursion is forced deeper into the housing, whereby the ring is rotated by another angle and the protrusion is aligned with the groove and the pushbar is displaceable into its extended position.

Using the drive respectively its push-push device of the present invention, a number of advantages are attained. The push-push kinematics of the invention contains a minimum of components and its manufacture is economical. Only plastic parts being used, service life is lengthened. Tolerances moreover can be tightened. The mechanical geometry of the push-push kinematics of the present invention is simple, and this kinematics may be installed in automated manner. The push-push kinematics of the present invention allows modular construction to meet different requirements. It is compact.

Advantageous embodiment modes of the present invention are defined in the dependent claims.

In one embodiment mode of the present invention, the pushbar is fitted with three circumferentially equidistant grooves running parallel to its axis, further with a first and second deflection face and three locking recesses. At its internal surface, the ring comprises three circumferentially equidistant protrusions. In this design, the ring will rotate by 120° when the pushbar is moved out of the locked position and then back into the unlocked one. This feature is easily implemented using appropriate control faces.

The reliability of operation of the push-push kinematics of the present invention is increased when the ring is supported in rotating manner with deceleration/speed control applied as needed. Accordingly, in one embodiment mode of this invention, the ring may be fitted at its outside with at least one tangential, resilient tang of which the end—in the relaxed state—projects beyond the ring's outer circumference. In the installed condition, the resilient tang is stressed against a cylindrical wall of said housing. Consequently the ring may be rotated only when a predetermined rotational force has been applied. In this respect another embodiment of the invention fits the cylindrical wall with a serrate snap-in surface in a manner that the ring can rotate only in one direction whereas, for the opposite direction, the resilient tang cooperates with the snap-in toothing. Ring rotation in the other direction would make the kinematics uncontrollable.

To allow simple installation, in one embodiment mode of the invention, a housing aperture if fitted into a cover which can be snapped onto the housing. In this embodiment, the ring preferably is received in an inner annular recess in the pushbar.

In another embodiment mode of the present invention, the first and second deflection faces and the locking recess are constituted on radial pushbar rises.

To prevent contaminants from entering the push-push kinematics, a further embodiment mode of the present invention provides an axially collapsing cap covering the pushbar outside the housing and being configured outside this housing. This cap is connected preferably in geometrically interlocking manner with the pushbar respectively the housing respectively the cover.

An illustrative embodiment mode of the present invention is elucidated below in relation to the appended drawings.

Figure 2:
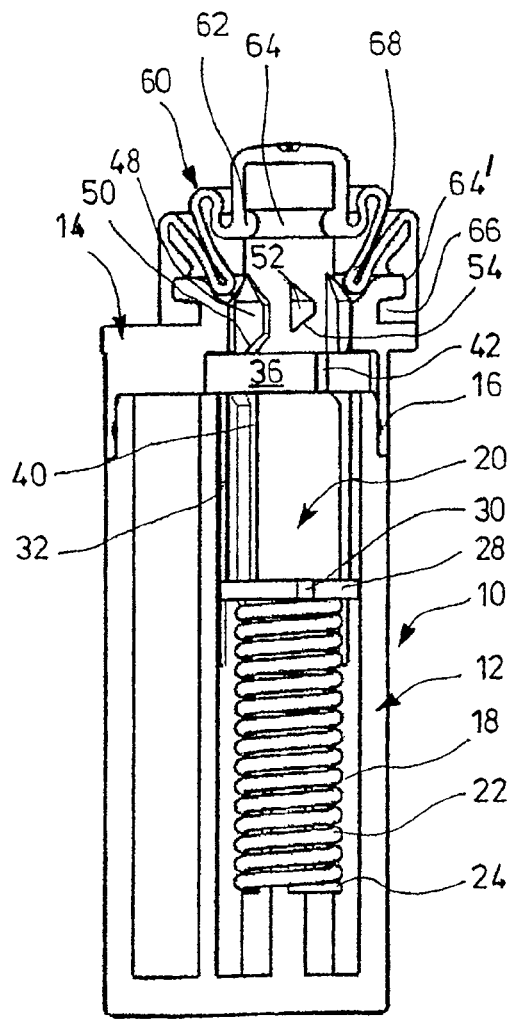
Figure 3:
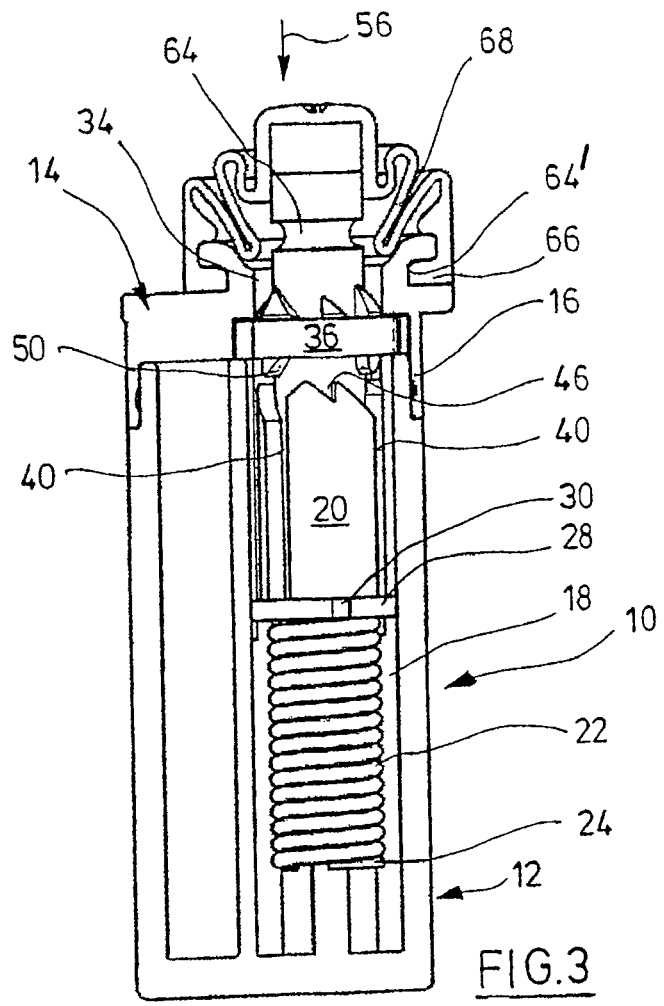
Figure 4:
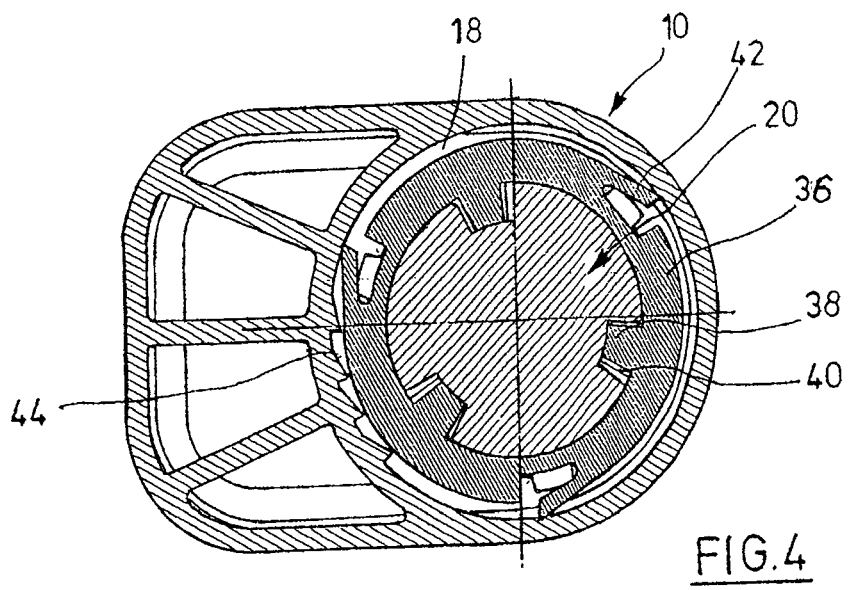
Figure 5:
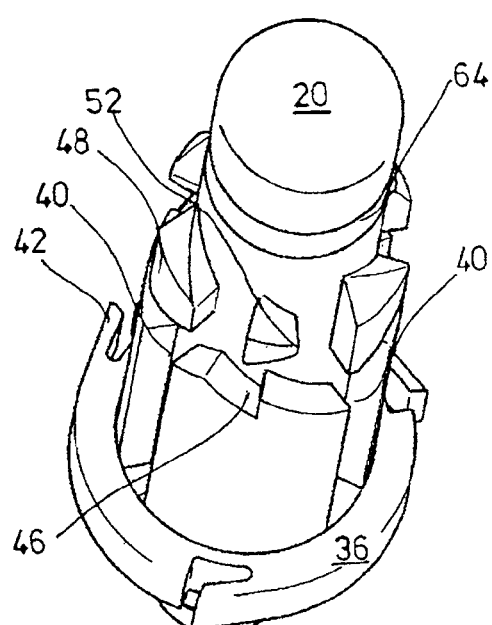
Figure 6:
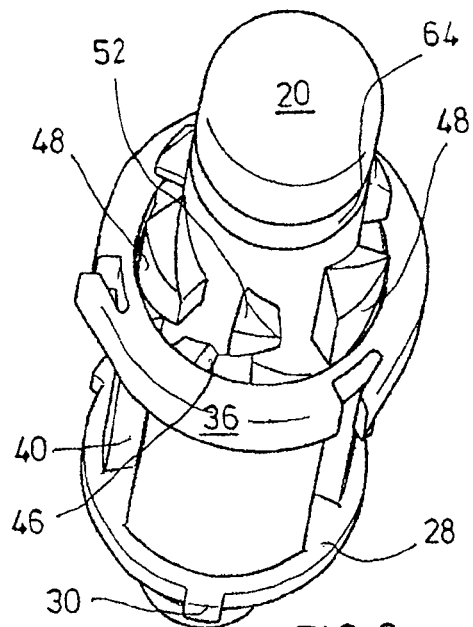
Figure 7:
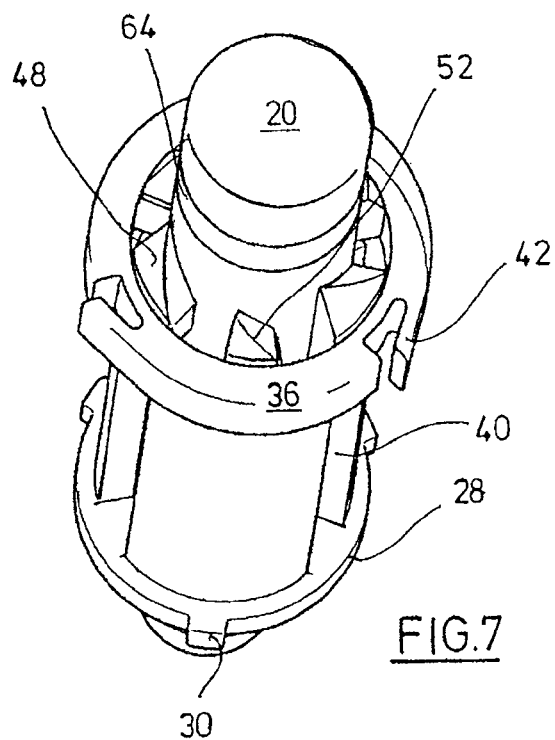

FIG. 1 is a cross-section of a push-push kinematics of the invention in its open state, FIG. 2 shows the push-push kinematics of FIG. 1 in its locked state, FIG. 3 shows the unlocked state of the push-push kinematics of either FIG. 1 or FIG. 2, FIG. 4 is a cross-section relating to FIG. 1 along line 4-4, FIG. 5 is a perspective of the pushbar kinematics of FIG. 1, FIG. 6 is a perspective of the pushbar kinematics of FIG. 2, and FIG. 7 is a perspective of the pushbar of the push-push kinematics of FIG. 3.

FIGS. 1 through 3 show a drive system comprising a housing 10 fitted with a lower housing segment 12 that is open at its top and with a cover 14. The cover 14 is linked by a snap-in or weld connection to said lower housing segment. Said link however is not discussed in detail herein.

The lower housing segment 12 subtends an approximately cylindrical and axial cavity 18 receiving a pushbar 20. The cavity 18 also receives a helical spring 22 resting by its lower end on a support 24. At its upper end said spring encloses a shank 26 of the lower end of said pushbar. Above said bolt 26 the pushbar is fitted with a radial flange 28 serving as a rest for the spring 22. Said flange moreover is fitted with radial protrusions 30 engaging axially parallel grooves within said cavity 18, as a result of which the pushbar during an up and down motion can be displaced only linearly.

Depending on its positions shown in FIGS. 1 and 3, the pushbar 20 runs upward by a different length through an aperture 34 in the cover 14. The aperture 34 flares upward like a bugle. A ring 36 is received in a recess of the cover 14. FIG. 4 shows the ring geometry. It comprises three equidistant protrusions 38 situated at its inner periphery; said protrusions engage axially parallel grooves 40 of the pushbar 20. Tangential resilient tangs 42 are constituted externally between each of the protrusions 38 and, when in their relaxed state, project beyond the outer periphery of the ring 36. They cooperate with the cylindrical inner wall of the cavity 18 and in the process decelerate/control the speed of rotation of the ring 36, said rotation, as elucidated further below, being counter-clockwise. Moreover a sawtooth arc 44 is constituted in the wall of the cavity 18. This sawtooth arc makes sure that the ring cannot rotate clockwise, as otherwise each tang jointly with a tooth of the sawtooth arc 44 would be jamming.

The grooves 40 are subtended by corresponding rises at the outside of the pushbar 20. At their upper edge, the rises subtend an upwardly open locking notch 46 of triangular contour. Beveled faces are indicated on each side of the locking notch 46. A further rise 48 is constituted on the pushbar 20 above each groove 40 running parallel to the pushbar's axis and subtends a first deflection face 50 running obliquely downward. A further rise 52 is constituted between the rises 48 and at the outside of the pushbar 20, subtending a lower, second deflection face 54.

In the embodiment mode shown in FIG. 1, the pushbar 20 is maximally extended and its flange 28 rests against the underside of the ring 36. When the pushbar is depressed from the top toward the bottom as indicated by the arrow 56, the spring 22 shall be compressed and the protrusions 38 will move along the axially parallel grooves. As the compression increases, the protrusions 38 make contact with the deflection faces 50. As a result the ring is rotated anti-clockwise by a given angle. When the force 56 is no longer applied, the spring 22 forces the pushbar upward again, as a result of which the protrusions 38 are received in the locking recesses 46. This state is shown in FIG. 2. The protrusions and the locking recesses are not visible in FIG. 2. In the configuration of FIG. 2, the push-push kinematics is locked in the shown position.

If such locking is to be disengaged, then, as indicated in FIG. 3, the pushbar 20 is moved farther relative to the position of FIG. 2 into the cavity 18. As a result the locking recess 46 is disengaged from the protrusion 38. When the force is no longer applied to the pushbar 20, the spring 22 moves it upward again. In this manner the deflection face 54 makes contact with the bevel to the left of the locking recess 46. As a result, the ring 36 is rotated through another angle until the protrusions 38 are again aligned with the grooves 40. When the pushbar then is released, it moves back into the position of FIG. 1.

In this manner, an illustrative fuel tank flap being loaded by the pushbar 20, may be moved against the force of the spring 18, 22 into a locked position wherein it is flush with the outside of the automobile's body sheetmetal. When, after having been disengaged, the flap is pressed inward, the locked position of the push-push kinematics is released and thereupon the pushbar is able, as indicated in FIG. 1, to pivot the flap through a given angle. This feature is not shown. However the principle is well known.

As further shown in FIGS. 1 and 3, a flexible cap 60 is mounted on the cover 14. The cap comprises at its inside an annular bead at 62 cooperating with an annular groove 64 in the pushbar 20. An inner annular groove 64' at the lower end of the cap 60 receives an annular flange 66 of the cover 14. In this manner the cap 60 geometrically interlocks with the cover 14. When pressure is applied to the cap 60 and hence to the pushbar 20 as shown in FIG. 1 (reference 56), the cap 60 collapses into folds, a main fold 68 being received in the cover 14 by the bugle-shaped widening of the aperture 34.

FIGS. 5 through 7 separately show a cutaway enlargement of the pushbar 20 and the ring 36, namely as shown in the positions of FIGS. 1 through 3.

Consequently, the rises 48, 52 are each fitted with a bevel at their tops. These bevels simplify assembly. During assembly, first the housing 10 is opened and next the spring 22 is inserted. The pushbar 20 is made to pass through the ring 36, whereupon this sub-assembly is inserted into the cover 14. Then the cap 60 is affixed to the cover 14. Then this pre-assembled unit is linked by means of the snap-in or weld joint 16 to the lower housing segment 12. Such assembly also may be wholly automated.

The invention claimed is:

1. A drive for actuating a flap pivotably supported in or on an automobile, comprising a push-push kinematics cooperating with one side of the flap, said push-push kinematics comprising:
   a housing suitable for integration into an automobile,
   a pushbar Which is supported in axially displaceable manner in the housing and which in all its axial positions partly projects through a housing aperture out of the housing and comprises an external actuation end cooperating with the flap,
   a spring in the housing prestressing the pushbar to project from the housing,
   a rotatable ring which encloses the pushbar and which is supported in the housing in an axially fixed manner,
   at the outside of the pushbar, at least one groove running parallel to its axis and at least one protrusion at the inner circumference of said ring to engage said groove over a wide adjustment range of the pushbar, as a result of which the ring retains its rotational position in said range of the groove when the pushbar is displaced axially,
   a first deflection face which runs obliquely to the axis of the pushbar and is configured between the groove and the actuation end and which cooperates with the protrusion of the ring and rotates this ring through a predetermined angle when the pushbar is displaced by a predetermined first excursion into the housing,
   a locking recess pointing toward the actuation end and situated at the pushbar at a circumferential spacing from the first deflection face and receiving the protrusion when the pushbar is released following the first excursion, as a result of which the pushbar following a return excursion is locked in a locked position in the housing, and a second deflection face running obliquely to the pushbar axis between the locking recess and the actuation end, cooperating with the protrusion when the pushbar is moved out of the locked position by means of a second excursion farther into the housing, whereby the ring is rotated by a predetermined second angle and the protrusion is aligned with the groove and the pushbar is displaceable into its maximally extended position.

2. Drive as claimed in claim 1, wherein the pushbar is fitted with three circumferentially equidistant grooves running parallel to the pushbar axis, further with first and second deflection faces and locking recesses and in that the ring is fitted at its inner circumference with three circumferentially equidistant protrusions.

3. Drive as claimed in claim 1, wherein the ring is rotatably supported in the housing and in a decelerating/speed-controlling manner.

4. Drive as claimed in claim 3, wherein the ring is fitted at its outside with at least one tangential resilient tang of which the end projects beyond the external periphery of the ring when the latter is in its unloaded state and which when loaded rests against a cylindrical wall of the housing.

5. Drive as claimed in claim 4, wherein the cylindrical wall is fitted with a serrate snap-in toothing in a manner that the ring is rotatably only in one direction of rotation opposite to a direction in which the resilient tang cooperates in a blocking manner with the snap-in toothing.

6. Drive as claimed in claim 5, wherein the housing aperture is subtended in a cover is deposited in an engaging manner on the housing.

7. Drive as claimed in claim 6, wherein the ring is received in an inner ring recess of the cover.

8. Drive as claimed in claim 1, wherein the pushbar is fitted with at least one radial protrusion acting as a rest for the spring and in turn resting against the ring when the pushbar is situated in its most extended position.

9. Drive as claimed in claim 1, wherein the first and second deflection faces as well as the locking recess are subtended at radial rises of the pushbar.

10. Drive as claimed in claim 1, wherein the groove running parallel to the pushbar axis is subtended between adjacent rises of said pushbar.

11. Drive as claimed in claim 1, wherein an axially collapsible cap made of a flexible material covers the pushbar outside the housing.

12. Drive as claimed in claim 11, wherein the cap cooperates by means of an inner annular bead with an annular groove of the pushbar by being affixed when required into said groove.

13. Drive as claimed in claim 12, wherein at its free end, the cap is fitted with an inwardly directed flange engaging an external annular groove of the housing.

14. Drive as claimed in claim 13, wherein said annular groove is bounded by an externally pointing, radial flange engaging an inner annular groove of the cap.

* * * * *